(12) United States Patent
Lewis

(10) Patent No.: US 6,186,137 B1
(45) Date of Patent: Feb. 13, 2001

(54) COOKING APPARATUS

(76) Inventor: Ronald A. Lewis, P. O. Box 38, Terrace, B.C. (CA), V8G 4A2

( * ) Notice: Under 35 U.S.C. 154(b), the term of this patent shall be extended for 0 days.

(21) Appl. No.: 09/491,879

(22) Filed: Jan. 27, 2000

(51) Int. Cl.$^7$ ........................ F24B 3/00
(52) U.S. Cl. ............ 126/30; 126/25 A; 248/156
(58) Field of Search .............. 126/29, 30, 25 R, 126/25 A, 9 R, 9 B, 50, 25 AA, 40; 248/146, 156, 145, 124.1, 125.1, 125.2

(56) References Cited

U.S. PATENT DOCUMENTS

| | | |
|---|---|---|
| 1,414,771 | 5/1922 | Cantleberry . |
| 1,645,768 | 10/1927 | Morten . |
| 4,065,085 | 12/1977 | Gellatly ........................ 248/124 |
| 4,096,951 | 6/1978 | Menssen ........................ 211/207 |
| 4,120,280 | 10/1978 | Iverson et al. ................. 126/30 |
| 4,269,164 | 5/1981 | Van Grinsven et al. ........ 126/30 |
| 4,363,313 | * 12/1982 | Smith ............................. 126/30 |
| 4,538,589 | * 9/1985 | Preston ....................... 126/25 A |
| 4,892,032 | * 1/1990 | Jerome ....................... 126/25 A |
| 5,355,867 | * 10/1994 | Hall ............................... 126/30 |
| 5,666,940 | 9/1997 | Kreitre .......................... 126/30 |
| 5,819,718 | 10/1998 | Leiser ........................... 126/30 |
| 5,848,584 | 12/1998 | Brog ............................. 126/30 |
| 5,862,742 | 1/1999 | Bjerg ............................ 99/449 |
| 5,908,026 | 6/1999 | Forst ......................... 216/25 AA |

FOREIGN PATENT DOCUMENTS

| | | |
|---|---|---|
| 0200271 | 5/1920 | (CA) . |
| 0254012 | 9/1925 | (CA) . |
| 0259703 | 4/1926 | (CA) . |
| 0605694 | 9/1960 | (CA) . |
| 0655776 | 1/1963 | (CA) . |
| 0737246 | 6/1966 | (CA) . |
| 1170136 | 7/1984 | (CA) . |
| 1185854 | 4/1985 | (CA) . |
| 2030717 | 5/1992 | (CA) . |

* cited by examiner

Primary Examiner—James C. Yeung
(74) Attorney, Agent, or Firm—Lance A. Turlock

(57) ABSTRACT

Cooking apparatus comprises an elongated post supportable in an upright position in proximity to a cooking fire, a collar slidably mounted directly on the post for sliding movement along the post; a cooking platform secured to the collar, a tether, and a hook or link engaging mechanism carried at the upper end of the post. At least a portion of the tether is a link chain. The hook or link engaging mechanism serves to releasably secure the collar together with the platform at a selected position of elevation on the post. In order to control the cooking process, the apparatus may be structured not only to control the elevation of the cooking platform over the cooking fire but also to control the horizontal angular position of the cooking platform in relation to the cooking fire. A cooking platform having a rectangular perimeter may be mounted to the collar near a corner of the perimeter to achieve a practical balance between the cooking area or area of reach of the platform and the tipping moment force of the platform on post.

4 Claims, 2 Drawing Sheets

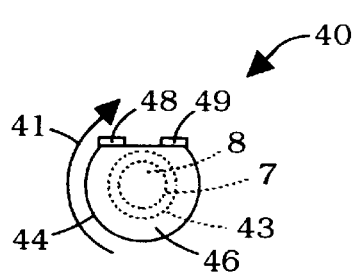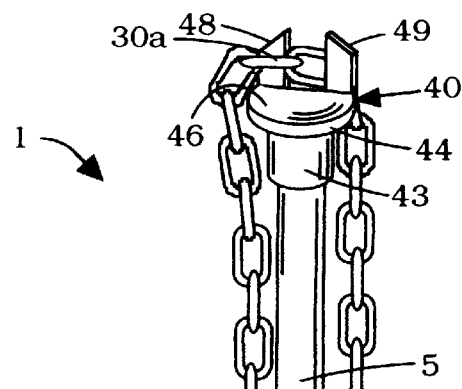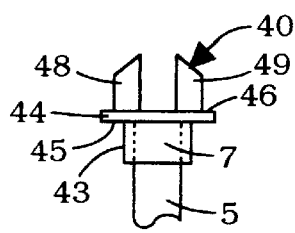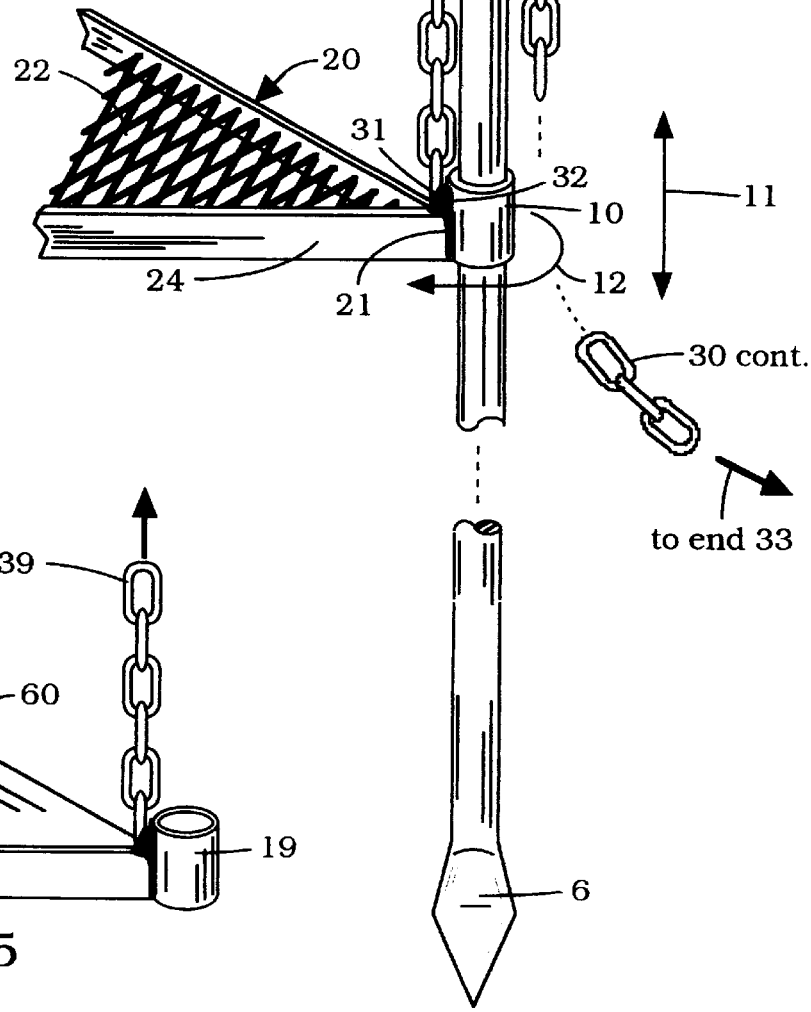

COOKING APPARATUS

FIELD OF THE INVENTION

This invention relates to cooking apparatus for adjustably supporting a cooking platform over a cooking fire, and particularly to apparatus of the type where the platform extends over the fire from an upright support post. Generally, it is contemplated that it will be most useful for campers and others engaged in outdoor activities.

BACKGROUND TO THE INVENTION

The prior art is replete with cooking apparatus that meets the foregoing general description. Early examples include Canadian Patent No. 200,271 (Emerick) granted on May 25, 1920, and Canadian Patent No. 254,012 (Lorton) granted on Sep. 22, 1925. Both Emerick and Lorton disclose cooking apparatus comprising an elongated post supportable in an upright position in proximity to a cooking fire. Each includes a collar slidably mounted on the post and a cooking platform such as a grill or a pot or a pan holder, and each requires the collar to bite or bind with the post in order to hold the platform at a desired elevation above the fire. Such arrangements are prone to unwanted slippage and at the very least will require relatively careful sizing of the collar in relation to the post to achieve a sufficient bite or binding effect with the post. The effectiveness that is achieved may depend upon various factors including the weight of cooking platform, the hardness or smoothness of the parts that are expected to bind, and variations in sizes and other characteristics that may occur with temperature. Whatever effectiveness is achieved may deteriorate with wear and tear.

An example of a post and platform construction where the position of the platform can be controlled in a more positive manner is disclosed in Canadian Patent No. 605,694 granted to Martin et al. on Sep. 27, 1960. Here, the collar includes a simple clamp bolt which may be loosened to move the collar back and forth along the length of the post, and tightened to the post to secure the collar with the platform in a desired position. However, such an arrangement undesirably requires the user to directly hold and manipulate not only the bolt but also the collar, or the platform or platform mounting mechanism, while tightening or loosening the clamp bolt. Such manipulation not only can be awkward but also messy if the various parts that are grasped have become spattered with oils, cooking fats or the like. Further, depending upon proximity to the fire, some of the parts may become quite hot.

More recent examples include Canadian Patent No. 737, 246 granted to Petrie on Jun. 28, 1966. Petrie shows a cooking platform secured to a collar which in turn is slidably and rotatably mounted on an upright post. In one embodiment, the position of the collar on the post is positively secured by a cable or tether which is secured at one end to the collar and which includes at its other end a pin mechanism that can be hooked by means of a pin into any one of a large number of holes formed in the upper portion of the post. In another embodiment, the pin mechanism is replaced by a "positioning member" adapted to frictionally engage any selected position on the upper end of the post and thereby secure the position of the collar lower down on the post. In the first embodiment, the pin mechanism appears fragile and has a relatively complex configuration. Further, it undesirably requires a large number of holes to be formed in the post. The second embodiment lacks positive securement by reason of its dependency on frictional engagement and thus may be considered as being subject to the same disadvantages as the designs of Emery and Lorton noted above. In the case of both embodiments, any elevational adjustment that a user might wish to make effectively requires the user to use finger tip control when grasping either the pin mechanism or the positioning member, as the case may be.

A still more recent example is to be found in U.S. Pat. No. 4,269,164 granted to Van Grinsven et al. on May 26, 1981. Van Grinsven et al. disclose a circular cooking platform suspended from an inverted L-shaped post, the leg of the inverted L extending upright from a ground post in which, it appears, that the L-shaped post may pivot. The platform is suspended by rigging from a tether, a portion of the tether being strung through an upper end of the post and a remaining portion comprising a link chain adjustably attached to a tarp hook secured at a lower position on the post. The elevation of the platform can be adjusted by engaging a selected link of the chain with the hook. Such a configuration requires a relatively large number of parts and may be considered relatively complex given the basic task at hand which is to adjustably position a simple cooking platform in relation to a cooking fire. The need for rigging is considered undesirable because it interferes with access to the cooking platform. Further, the rigged and suspended platform in inherently unstable and requires added stabilizing means to address the problem.

Prior art designs reveal a variety of configurations for the cooking platform which form part of the apparatus. These include platforms having a rectangular perimeter, platforms having a circular perimeter, and platforms having a pie shaped perimeter. However, in deciding upon a particular configuration, it appears that little or no attention has been paid to the relationship between the extent and character of the platform's cooking area or area of reach, and the leveraging or tipping moment force that the platform will exert on a supporting post.

Accordingly, a primary object of the present invention is to provide new and improved cooking apparatus of the type where a cooking platform is adjustably supported to extend over a cooking fire from an upright post.

A related object of the present invention is to provide new and improved cooking apparatus of the foregoing type which positively secures the position of the cooking platform in relation to the cooking fire while permitting a given platform position to be easily and quickly adjusted.

A further object of the present invention is to provide new and improved cooking apparatus of the foregoing type which can be fabricated in a rugged configuration from a minimal number of parts that do not require careful tolerancing in their manufacture.

Yet another object of the present invention is to provide as part of such new and improved apparatus a cooking platform configured and mounted to the post in a manner that strikes an advantageous practical balance between the cooking area or area of reach of the platform and the leveraging or tipping moment force of the platform on the post.

SUMMARY OF THE INVENTION

In a broad aspect of the present invention there is provided a cooking apparatus which includes an elongated post supportable in an upright position in proximity to a cooking fire, a collar slidably mounted directly on the post for sliding movement along the post, a cooking platform secured to the collar, a tether extending from a first end secured to the collar to a free end, and a hook or link engaging means carried at the upper end of the post. At least a portion of the length of the tether is a link chain. The hook or link engaging means serves to releasably hook or engage a selected one of the links of the chain. When a selected link is hooked or engaged, the collar (and the platform therewith) is secured to the post at a corresponding selected position of elevation on the post.

Preferably, the length of the tether is substantially longer than the length of the post. This facilitates handling because the free end of the tether can then be positioned distant from the post and thus further away from the heat of the fire.

In use, the cooking platform normally will extend from the collar to reach over the cooking fire. However, to permit better control over the cooking process, the collar (and the platform therewith) is preferably rotatable on the post. This permits the platform to be rotated from a position directly above the fire to a position only partly above or completely away from the fire.

In a preferred embodiment where the post and the collar have cooperating cylindrical surfaces permitting the collar to rotate on the post, the link engaging function advantageously can be achieved utilizing a link engaging means which comprises a cap slidingly positioned over the upper end of the post and at least one prong extending from the cap for hooking a selected one of the chain links. The cap is rotatable on the post while so positioned. Without this or an equivalent arrangement, the tether may bind around the post as the platform is rotated with respect to the post. Consequently, the allowable degree of rotation may be quite limited depending upon the amount of slack in the tether. With the preferred arrangement, the cap will begin to rotate with the platform once the slack is taken up.

The cooking platform itself may have a variety of configurations. For example, it may comprise a gridiron or grill type structure for direct barbecue cooking or for holding pots or pans for other types of cooking. Alternately, it may comprise a thin metal sheet to facilitate fry cooking if pans are unavailable. Differing platforms may be used interchangeably. In any case, in a preferred embodiment of the present invention, the platform has a substantially rectangular perimeter, preferably a square rectangular perimeter, and is mounted to the collar near a corner of the perimeter.

Apparatus in accordance with the present invention requires very few parts and can be entirely fabricated from rugged, relatively inexpensive stock material. The position of the cooking platform is secured in a reliable, positive manner and is easily adjusted. Slidable and rotatable parts may be made relatively loose fitting without a need for careful tolerancing.

The foregoing and other features and advantages of the present invention will now be described in more detail with reference to the drawings.

BRIEF DESCRIPTION OF THE DRAWINGS

FIG. 1 is a perspective view, partially cut-away of cooking apparatus in accordance with the present invention.

FIG. 3 is a front elevation view of chain link engaging means shown in FIG. 1.

FIG. 4 is a top view of the chain link engaging means shown in FIG. 3.

FIG. 5 is a perspective view, partially cut-away of a cooking platform alternative to that shown in FIG. 1.

DETAILED DESCRIPTION OF PREFERRED EMBODIMENTS

Figure 2:
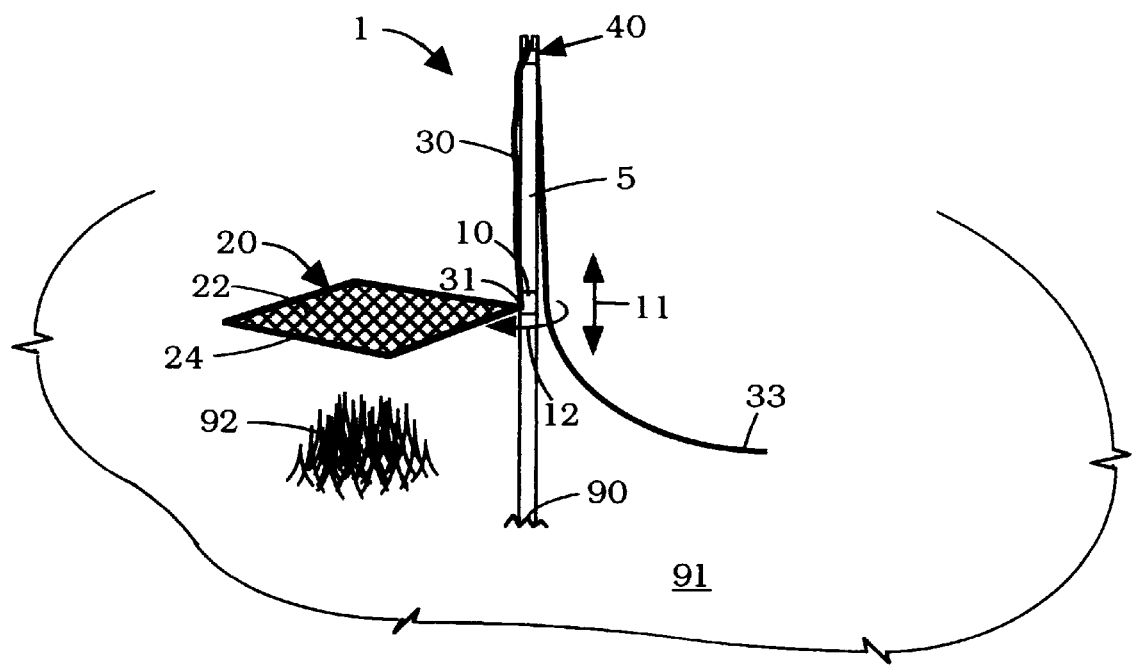
FIG. 2 is a representational view showing the cooking apparatus of FIG. 1 while in use.

The cooking apparatus generally designated 1 in FIGS. 1 and 2 includes an elongated cylindrical post 5, a cylindrical collar 10, a cooking platform generally designated 20, a link chain or tether 30 formed by a plurality of chain links, and a link engaging means generally designated 40 carried at the upper end of post 5. In FIG. 2, the apparatus is shown in use, pole 5 having been staked at 90 into ground area 91 in proximity to an open cooking fire 92. Platform 20 extends from post 5 over the fire.

Lower end 6 of post 5 has been shaped to a point that facilitates ground penetration and resultant support of the post in an upright position. Collar 10 is slidably mounted on post 5 for upward and downward sliding movement along the post as indicated by arrow line 11. Over the range of such sliding movement, collar 10 is also rotatable on post 5 (as indicated by curved arrow line 12) because both the post and the collar are cylindrical.

Cooking platform 20 includes a grill or gridiron 22 supported by a framework 24. The perimeter is generally that of a square rectangle. As best seen in FIG. 1, the framework, and hence platform 20 as a whole, is secured to collar 10 by welding at corner 21 of the framework.

Tether 30 is a link chain formed from a plurality of chain links. It extends from a first end 31 secured to collar 10 by welding at 32 to a free end 33. As seen in FIG. 2, the length of the tether from secured end 31 to free end 33 is substantially longer than the length of post 5. While it would be possible to make the tether partly from a link chain and partly from other means without chain links (for example, cords, cables or the like), and while it would be possible to add a gripping handle or the like to the tether, such possibilities are generally not favored because they add to the number of parts.

As best seen in FIGS. 3 and 4, link engaging means 40 comprises a cap formed by a cylindrical sleeve 43 closed at its top end by an end plate 44 and open at its bottom end. A pair of prongs 48, 49 extends upwardly from end plate 44 of the cap.

Sleeve 43 is slidingly positioned over upper end 7 of post 5 until the lower surface 45 of end plate 44 abuts flush with top surface 8 of post 5. In this position, the cap is rotatable on post 5 as indicated in FIG. 3 by curved arrow line 41.

It will be observed that end plate 44 has a flat upper surface 46. This allows post 5 to be pounded into supporting ground while the cap is in place—a feature which is advantageous if cooking apparatus 1 has been set up at a desired site as shown in FIG. 2, and it is subsequently found that the initial ground support is somewhat unstable.

Referring now to FIG. 1, it will be seen that link 30a of tether 30 is hooked by prong 48 of link engaging means 40 thereby securing collar 10 with platform 20 at a corresponding position of elevation on post 5. Of course, this is a selective choice. Optionally, an immediately adjacent link or a more distantly located link on either side of link 30a could be selected and hooked by either prong 48 or prong 49 thereby raising or lowering the position of elevation. Although two prongs 48, 49 are used, it is obvious that only one would suffice.

Generally, the fitting of collar 10 and link engaging means 40 on post 5 should be relatively loose. This serves to avoid binding and to permit these parts to rotate and/or slide on the post with relative ease. It necessarily follows that careful tolerancing is not a factor in the manufacture of such parts.

It will be understood by those skilled in the art that all parts described above can be readily fabricated from off-the-shelf iron chain and metal stock with only a minor amount of cutting, welding and metal shaping.

An alternative cooking platform 60 is shown FIG. 5. Although shown only in part, it is to be understood that platform 60 has an overall square rectangular perimeter like that of platform 20 and that the only difference of substance is the provision of a thin metal sheet 62 in place of gridiron 22. Platform 60 is secured at a corner to a collar 19 by welding in the same manner as cooking platform 20 is secured to collar 10. Likewise a link chain tether 39 is secured by welding to collar 19 in the same manner as tether 30 is secured to collar 10. Generally, platform 60, collar 19 and tether 39 may be used with post 5 and link engaging means 40 in the same manner as described in reference to platform 20, collar 10 and tether 30.

It will be understood that a cooking platform used in conjunction with the present invention need not have a square rectangular perimeter as in the case of cooking platforms 20, 60. There are any number of possibilities including a circular perimeter, a pie-shaped perimeter, a rectangular perimeter which is not square, etc. However, a rectangular perimeter, secured to the collar at a rectangular corner, and especially a square rectangular perimeter, is preferred because it is easy to construct and is considered to strike an advantageous balance between the cooking area or area of reach of the platform and the leveraging or tipping moment force of the platform on post 5. More particularly, reference is now made to FIG. 6 which representationally depicts a top view of cooking platform 20, collar 10 and post 5 against a representation of the perimeter a circular platform 100, the latter of which has the same maximum reach as platform 20.

Figure 6:
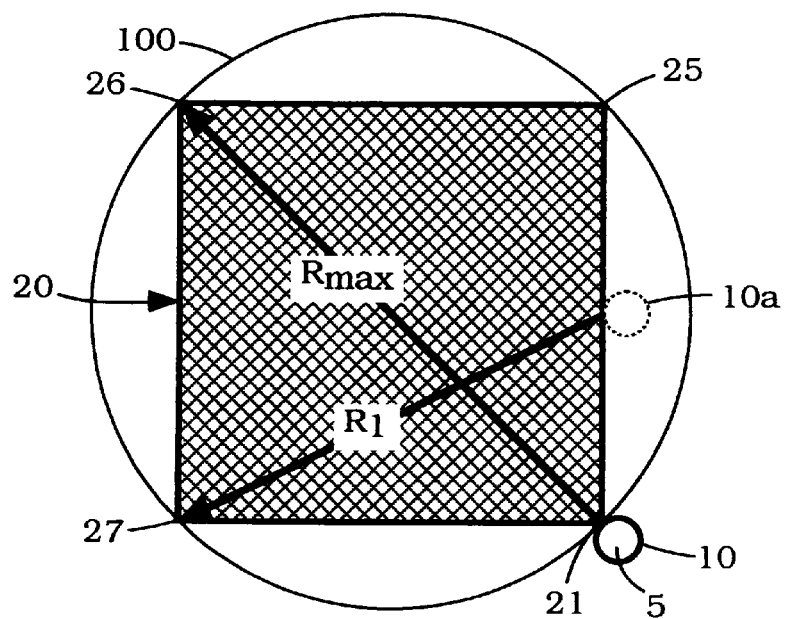
FIG. 6 is a representational drawing used in conjunction with the description which follows to explain a preference for a rectangular cooking platform mounted in the manner shown in FIGS. 1 and 2.

In FIG. 6, the maximum reach is indicated by arrow line $R_{max}$ which extends from corner 21 to corner 26 of platform 20. Assuming that the region around corner 26 is above the hottest area of a cooking fire, then the cooking temperature will progressively diminish moving from corner 26 to corner 21. Likewise, it will diminish but not to the same degree moving from corner 26 to either corner 25 or corner 27. Thus, there is a relatively broad area over which food can be moved with exposure to differing temperatures to control the rate of cooking.

In comparison, circular platform 100 obviously offers additional cooking area. But, it will not offer any greater range of cooking temperatures. As a practical matter, it has been found that a reasonably sized square rectangular area is quite sufficient. Further, assuming that the weight per square inch of circular platform 100 is the same as that of platform 20, it will obviously be correspondingly heavier than platform 20 and will impose a greater leveraging or tipping moment force on post 5.

In comparison to square rectangular platform 20, the weight of circular platform 100 (having the same maximum reach $R_{max}$ and the same weight per square inch as platform 20) will be more than 1½ times greater. If platform 20 was not square, but remained sized such its corners still would touch the circle perimeter of platform 100, then the weight advantage would be further improved but at the sacrifice of some cooking area.

If circular platform 100 was made pie-shaped by truncating that portion of its perimeter which leads from corner 27 to corner 21 and, as well, that portion leading from corner 21 to corner 25 of platform 20, then the overall weight would be reduced, but the platform would still impose a greater tipping moment on post 5 because it obviously would still be heavier than platform 20. Further, its center of gravity would be more distant from post 5 and, necessarily, point 90 (see FIG. 2) where post 5 is staked into the ground.

FIG. 6 also indicates possible alternative placement of collar 10. The collar (now shown in broken outline and identified as 10a) is positioned mid-way between corners 21 and 25 of platform 20. Here, the leveraging action or tipping moment the platform on post 5 will be reduced because the center of gravity of the platform is nearer to the post. However, the maximum reach of the platform likewise would be reduced. In other words, reach $R_1$ (extending from collar 10a to corner 27 in FIG. 6) would be the maximum available reach. As will be appreciated from FIG. 6, $R_1$ is necessarily less than $R_{max}$ and, except at corner 21, 25, 26 or 27, this would be the case regardless of where the collar might be placed on the perimeter of platform 20.

In use, cooking apparatus 1 is set up in the manner shown in FIG. 2. Note that tether 30 has been drooped and extended away from post 5, and that its free end 33 rests on ground 91 distant from both the post and cooking fire 32. This keeps the extending portion of the tether away from the post and the fire, and permits a user to easily grip the tether at a convenient point for the purpose of making adjustments to the elevation of platform 20. If adjustments are desired, the user merely disengages the tether from link engaging means 40 while holding the tether. Then, while continuing to hold the tether, the user may permit collar 10 with platform 20 to ease down pole 5 to a desired elevation under its own weight or, may lift the collar with the platform up to a desired elevation. The tether is then re-engaged with link engaging means 40.

If it is desired to turn platform 20 fully or partially away from a fire, the user merely needs to push in an appropriate direction on the platform. Collar 10 will then rotate on post 5. To avoid the fire and the potentially hot cooking platform, the user may utilize a branch, stick or other convenient tool for this purpose. With such rotation, tether 30 may begin to wrap on post 5 and tighten. But binding will be avoided because, with sufficient rotation of the platform, the tether will pull or act on link engaging means 40 in a manner such that cap (43, 44) rotates with the platform.

It is to be understood that various modifications and changes can be made to the form, details, arrangement and proportion of the various parts described with reference to the embodiments described above without departing from the scope of the present invention. The invention is not to be construed as limited to the particular embodiments that have been described and should be understood as encompassing those embodiments which are within the spirit and scope of the claims that follow.

I claim:

1. Cooking apparatus comprising:
    (a) an elongated cylindrical post supportable in an upright position in proximity to a cooking fire, said post having a length defined between an upper end and a lower end of said post;
    (b) a cylindrical collar slidably mounted directly on said post for sliding movement along said post;
    (c) a cooking platform secured to said collar;
    (d) a tether extending from a first end secured to said collar to a free end, at least a portion of the length of said tether comprising a link chain having a plurality of chain links;
    (e) a cap slidingly positioned over said upper end of said post and rotatable on said post in such position; and,
    (f) a prong extending from said cap for releasably engaging a selected one of said links and thereby securing said collar with said platform to said post at a corresponding selected position of elevation on said post, said collar being rotatable on said post at said position of elevation.

2. Cooking apparatus as defined in claim 1, wherein said platform has a substantially rectangular perimeter and is mounted to said collar near a corner of said perimeter.

3. Cooking apparatus as defined in claim 2, wherein said perimeter is a substantially square rectangular perimeter.

4. Cooking apparatus as defined in claim 1, wherein said first end of said tether is an end link of said link chain secured to said collar by welding said end link to said collar.

* * * * *